(12) United States Patent
Allen et al.

(10) Patent No.: US 10,040,313 B2
(45) Date of Patent: Aug. 7, 2018

(54) PROCESSES AND MACHINES FOR DECORATING ARTICLES OF MANUFACTURE

(71) Applicant: The Procter & Gamble Company, Cincinnati, OH (US)

(72) Inventors: Matthew Richard Allen, Mason, OH (US); Robert Paul Cassoni, Washington Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 362 days.

(21) Appl. No.: 14/506,028

(22) Filed: Oct. 3, 2014

(65) Prior Publication Data

US 2015/0096661 A1 Apr. 9, 2015

Related U.S. Application Data

(60) Provisional application No. 61/886,963, filed on Oct. 4, 2013.

(51) Int. Cl.
| | |
|---|---|
| *B44C 1/00* | (2006.01) |
| *B44C 1/10* | (2006.01) |
| *B32B 37/00* | (2006.01) |
| *B44C 3/02* | (2006.01) |
| *A45D 40/00* | (2006.01) |
| *B41J 3/407* | (2006.01) |

(52) U.S. Cl.
CPC .............. *B44C 1/10* (2013.01); *B32B 37/00* (2013.01); *B44C 3/025* (2013.01); *A45D 2040/0012* (2013.01); *B41J 3/4073* (2013.01); *B44C 1/00* (2013.01); *B65D 2203/00* (2013.01); *Y10T 156/10* (2015.01)

(58) Field of Classification Search
CPC .............. B41F 15/0872; B41F 15/0877; B41F 15/0881; B41F 15/0886; B41F 15/0895; B41F 17/006; B44C 1/00; A45D 2040/0012; B41J 3/4073; B41P 2219/43; B65D 2203/00
See application file for complete search history.

(56) References Cited

U.S. PATENT DOCUMENTS

| | | | |
|---|---|---|---|
| 3,915,087 A * | 10/1975 | Tiemann | B41F 15/0872 101/115 |
| D403,123 S | 12/1998 | Sgariboldi | |
| 5,941,394 A | 8/1999 | Siegler | |
| 6,283,022 B1 * | 9/2001 | Kamen | B41F 15/0872 101/120 |
| 6,287,221 B1 | 9/2001 | Pino | |

(Continued)

FOREIGN PATENT DOCUMENTS

| | | |
|---|---|---|
| DE | 2425774 A1 | 12/1975 |
| JP | H02-228910 | 9/1990 |

(Continued)

OTHER PUBLICATIONS

International Search Report and Written Opinion dated Dec. 22, 2014, 11 pgs.

*Primary Examiner* — Carson Gross
(74) *Attorney, Agent, or Firm* — David M Weirich

(57) ABSTRACT

Processes and machines for decorating exterior surfaces of elongated, three-dimensional, discrete articles of manufacture, with decorative indicia and textural patterns.

23 Claims, 12 Drawing Sheets

(56) References Cited

U.S. PATENT DOCUMENTS

| | | |
|---|---|---|
| 6,570,600 B2 | 5/2003 | Aroneo |
| 6,637,964 B1 | 10/2003 | Kuo |
| 7,614,498 B2 | 11/2009 | O'Keefe |
| 2004/0217022 A1 | 11/2004 | Irvine et al. |
| 2005/0167307 A1 | 8/2005 | Cheng |
| 2007/0157559 A1 | 7/2007 | Till |
| 2008/0116213 A1 | 5/2008 | Schlaupitz et al. |
| 2008/0247858 A1* | 10/2008 | Lourman ............ B41F 15/0872 414/779 |
| 2009/0120825 A1 | 5/2009 | Ruman et al. |
| 2009/0130350 A1 | 5/2009 | Lauer |
| 2009/0145511 A1* | 6/2009 | Till ........................ B41J 2/06 141/2 |
| 2009/0197231 A1 | 8/2009 | Sosalia |
| 2009/0212954 A1 | 8/2009 | Adstedt et al. |
| 2011/0067584 A1* | 3/2011 | Mueller .............. B41F 15/0872 101/35 |
| 2013/0056482 A1* | 3/2013 | Senn .................... B41J 3/4073 220/674 |
| 2015/0010722 A1 | 1/2015 | Yamada et al. |
| 2015/0144517 A1 | 5/2015 | Allen et al. |

FOREIGN PATENT DOCUMENTS

| | | |
|---|---|---|
| JP | H11-216984 | 8/1999 |
| JP | 2001-138484 | 5/2001 |
| JP | 2006143270 A | 6/2006 |
| JP | 3136213 | 10/2007 |
| JP | 2010-167747 | 8/2010 |
| WO | WO2012065307 A1 | 5/2012 |

* cited by examiner

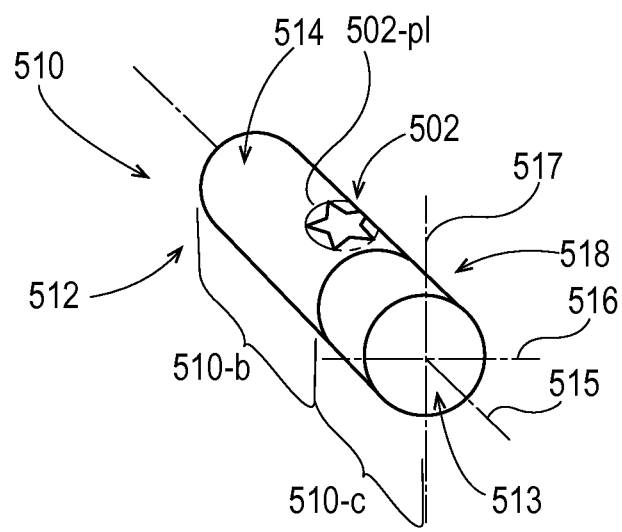
Fig. 5A
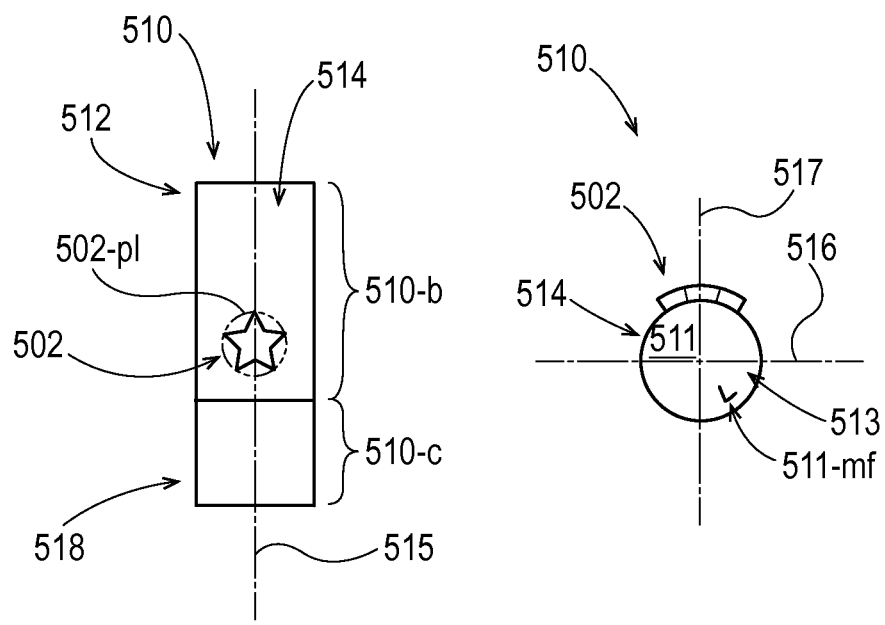
Fig. 5B
Fig. 5C

PROCESSES AND MACHINES FOR DECORATING ARTICLES OF MANUFACTURE

FIELD

The field of the present application is directed generally toward processes and machines for decorating articles of manufacture and more specifically toward, processes and machines for decorating, with a textural pattern, exterior surfaces of elongated, three-dimensional, discrete articles of manufacture, having indicia on their exterior surfaces.

BACKGROUND

There are many kinds of articles of manufacture, but some kinds of articles can be challenging to decorate. Discrete articles can be difficult for a machine to handle piece by piece. Decorations can be hard to fit onto complex or curved surfaces. And, elongated articles can require proper orientation in a decoration process. Thus, exterior surfaces of elongated, three-dimensional, discrete articles of manufacture (e.g. mascara packages) can be challenging to decorate.

There are also many ways to decorate articles of manufacture, but some kinds of decorations can be challenging to apply. Contact-type processes (e.g. hot-stamping) that form decorative indicia, call for a heated die and a separate material stream (e.g. the foil). Decorative textural patterns can require complex processing to obtain all-over coverage. And, applying multiple, different decorations to a single article can present registration issues. Thus, the combination of a contact-type decoration and a textural pattern can be challenging to apply to an article of manufacture.

As a result, applying the combination of a contact-type decoration and a textural pattern to elongated, three-dimensional, discrete articles of manufacture, can present a number of difficulties.

SUMMARY

However, the processes and machines of the present disclosure can be used to efficiently and effectively obtain elongated, three-dimensional, discrete articles of manufacture having combinations of decorative indicia and textural patterns, as described herein.

A process for decorating an article of manufacture, according to various embodiments of the present disclosure, includes: providing an elongated, three-dimensional, discrete article of manufacture with a longitudinal axis and an exterior surface, which includes an exterior side surface, offset from the longitudinal axis, and an indicium disposed on the exterior side surface at a particular location; providing a predetermined textural pattern of raised portions and open areas, to be applied to the exterior side surface; providing one or more non-contact, linearly arrayed, depositing-on-demand, pattern deposition devices, each of which includes a linear deposition axis; and depositing one or more layers of a material to form the predetermined textural pattern onto at least a portion the exterior side surface, by using the one or more pattern deposition devices, while the article rotates around the longitudinal axis and while the one or more pattern deposition devices are stationary with respect to the longitudinal axis, wherein each of the layers is deposited according to a common registration, which is based on the particular location.

A machine for decorating an article of manufacture, according to various embodiments of the present disclosure, includes: an indexing sub-assembly, including at least one article holder, configured to: hold in a fixed relationship, an elongated, three-dimensional, discrete article of manufacture; rotate an article that is being held; and at least one angular encoder, configured to detect an angular position of an article that is being held and rotated by the article holder; wherein the indexing sub-assembly is configured to move with an indexing movement within the machine to move the at least one article holder through each of a plurality of indexed positions, including: a registration indexed position with respect to a registration sub-assembly; and a deposition indexed position with respect to a deposition sub-assembly; and the registration sub-assembly: including, a sensor configured to detect a presence of a feature on an article that is being held by the article holder in the registration indexed position; wherein the registration sub-assembly is mounted to the machine separate from the indexing sub-assembly; and the deposition sub-assembly: including one or more non-contact, linearly arrayed, depositing-on-demand, pattern deposition devices, each of which is configured to deposit one or more layers of a material onto an exterior side surface of an article that is being held by the article holder in the deposition indexed position and that is being rotated by the article holder; wherein the deposition sub-assembly is mounted to the machine separate from the indexing sub-assembly; and a controller, wherein: the controller is in communication with the sensor, the angular encoder, and the one or more pattern deposition devices; and the controller is configured to: receive a detection signal from the sensor; receive an angular position from the angular encoder; and to send instructions to the one or more pattern deposition devices, to deposit one or more layers of material in a predetermined textural pattern, onto an exterior side surface of an article that is being held in the deposition position and rotated by the article holder.

BRIEF DESCRIPTION OF THE DRAWINGS

FIG. 5A illustrates a top perspective view of the exemplary article of manufacture of FIG. 2A, having an indicium and suitable for decorating with a textural pattern, according to embodiments of the present disclosure.

FIG. 5B illustrates a top view of the article of FIG. 5A.

FIG. 5C illustrates a bottom end view of the article of FIG. 5A.

DETAILED DESCRIPTION

The present disclosure includes processes and machines for use in efficiently and effectively decorating elongated, three-dimensional, discrete articles of manufacture to have combinations of decorative indicia and textural patterns, as described herein.

Figure 1:
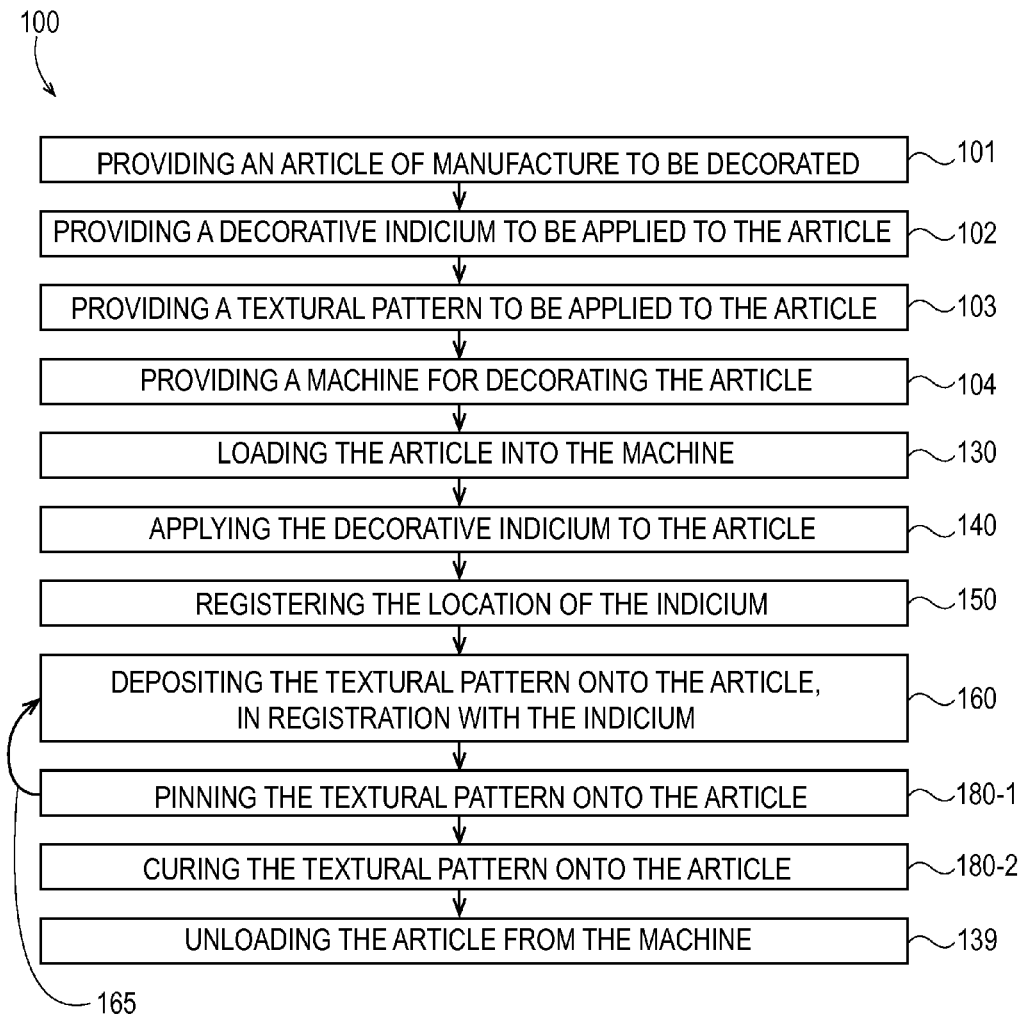
FIG. 1 is a flow chart depicting steps in a process of decorating elongated, three-dimensional, discrete articles of manufacture with decorative indicia and textural patterns, according to embodiments of the present disclosure.

FIG. 1 is a flow chart 100 depicting steps in a process of decorating elongated, three-dimensional, discrete articles of manufacture with decorative indicia and textural patterns, according to embodiments of the present disclosure.

Figures 2A, 2B, 2C:
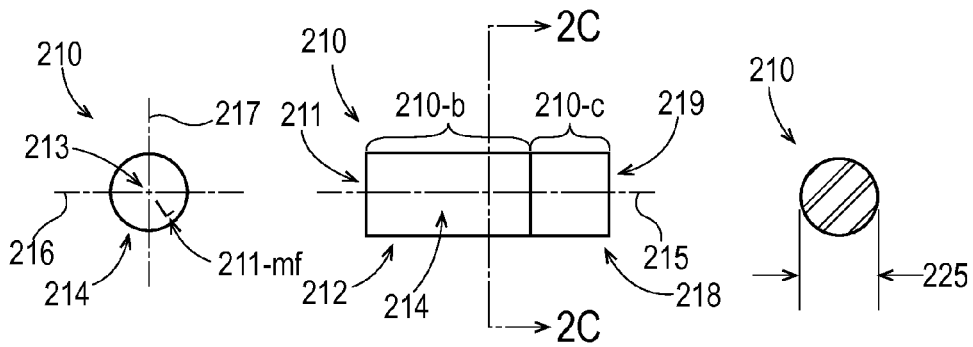
FIG. 2A illustrates a bottom end view of an exemplary article of manufacture, with an exterior surface having an overall shape that is cylindrical and is suitable for decorating with an indicium and a textural pattern, according to embodiments of the present disclosure.
FIG. 2B illustrates a side view of the article of FIG. 2A.
FIG. 2C illustrates a cross-sectional view of the article of FIG. 2B.

A first step 101 of the process 100 includes providing an article of manufacture to be decorated by a machine; the article can be any kind of elongated, three-dimensional, discrete article of manufacture described herein, such as article 210 of FIGS. 2A-2C, or as known in the art.

A second step 102 of the process 100 includes providing an indicium to be applied to the article of the first step 101; the indicium can be any kind of indicium described herein, such as indicium 502 of FIGS. 5A-5C, or as known in the art.

As used herein, the terms "indicium" and "indicia" refer to one or more of characters, graphics, branding, or other visual elements, of any size, shape, or configuration, in any combination, disclosed herein or known in the art. As used herein, the terms "character" and "characters" refer to one or more visual elements intended to convey information. Examples of characters include one or more of any of the following: letters, numbers, symbols, and the like. As used herein, the terms "graphic" and "graphics" refers to one or more visual elements intended to provide a decoration or to communicate information. Examples of graphics include one or more of any of the following: colors, patterns, designs, images, and the like. As used herein, the term "branding" refers to one or more visual elements intended to distinguish a product from other products. Examples of branding include one of more of any of the following: trademarks, trade dress, logos, icons, and the like.

Figure 6A:
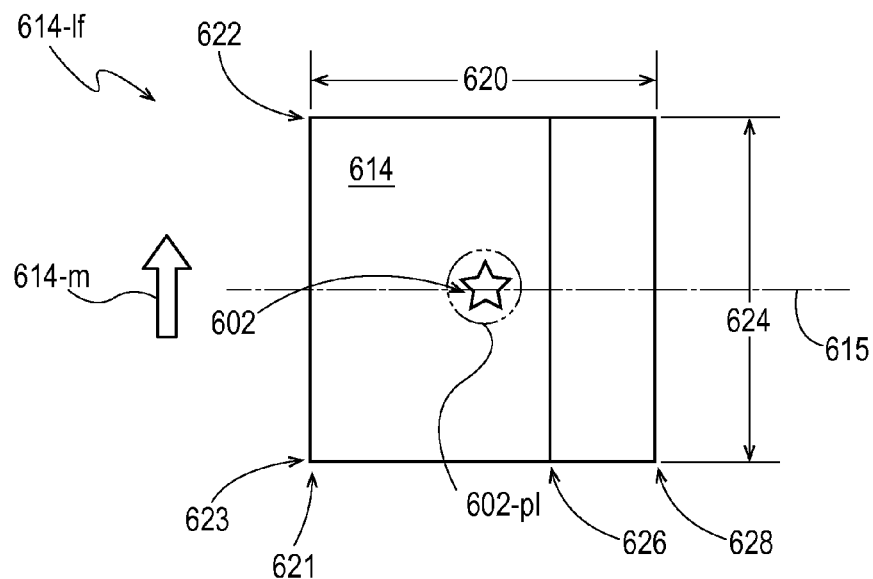
FIG. 6A illustrates a plan view of an exterior side surface of the article of FIG. 5A, as if the exterior side surface has been laid out flat.

A third step 103 of the process 100 includes providing a textural pattern to be applied to the article of the first step 101; the textural pattern can be any kind of pattern described herein, such as textural pattern 670 of FIG. 6A, or as known in the art. In various embodiments of the process 100, more than one textural pattern can be deposited in the third step 103.

A fourth step 104 of the process 100 includes providing a machine for decorating the article of the first step 101 according to the process 100, as disclosed herein. The machine can include one or more parts (e.g. subassemblies) configured for performing the steps 130, 140, 150, 160, 180-1, 180-2, and 139 on the article of the first step 101, as described herein. For example, the machine of the fourth step 104 can be the machine 1204-*a* of FIG. 12A, or the machine 1204-*b* of FIG. 12B, including any of their alternative embodiments, as described herein.

A fifth step 130 of the process 100 includes loading the article of the first step 101 into the machine of the fourth step 104. The loading of the fifth step 130 can be performed in any manner disclosed herein or known in the art. For example, the loading can be performed as described in connection with the embodiments of FIGS. 7A and 7B. Optionally, the fifth step 130 can be omitted, and the article can be provided to the machine of the fourth step without a loading step or the article can be received from inside of the machine after upstream manufacturing and/or processing.

A sixth step 140 of the process 100 includes using the machine of the fourth step 104 to apply to the article of the first step 101, the indicium of the second step 102. The applying of the sixth step 140 can be performed in any manner disclosed herein or known in the art. Optionally, the sixth step 140 can be omitted, and the article provided in the first step 101 can be provided already having an indicium, so an applying step is not necessary.

A seventh step 150 of the process 100 includes using the machine of the fourth step 104 to register the particular location of the indicium of the second step 102, on the article of the first step 101. The registering of the seventh step 150 can be performed in any manner disclosed herein or known in the art. For example, the registering can be performed as described in connection with the embodiments of FIGS. 8A and 8B. Optionally, the seventh step 150 can be omitted for embodiments in which it is not desirable to align the textural pattern of the third step 103 with the indicium of the second step 102.

An eighth step 160 of the process 100 includes depositing onto the article of the first step 101, the textural pattern of the third step 103. The depositing of the eighth step 160 can be performed in any manner disclosed herein or known in the art, and the textural pattern can be formed from one or more parts and/or one or more layers of material. For example, the depositing can be performed as described in connection with the embodiments of FIGS. 10A-11B. In various embodiments of the process 100, more than one textural pattern can be deposited in the eighth step 160. In some embodiments, the depositing of the eighth step 160 can represent a single-step, or multiple steps, or multiple processes (each with one or more steps).

A ninth step 180-1 of the process 100 includes pinning in place, on the article of the first step 101, the textural pattern deposited in the eighth step 160. While steps of the process 100 can be performed with various timings/orders, the present disclosure particularly contemplates embodiments wherein the pinning of the ninth step 180-1 can begin before the depositing of the eighth step 160 has ended, such that portions of these steps can be performed at overlapping times. The pinning of the ninth step 180-1 can be performed in any manner disclosed herein or known in the art. Optionally, the ninth step 180-1 can be omitted for embodiments in which it is not necessary to pin the deposited textural pattern. And, optionally, in various embodiments, after some or all of the pinning in the ninth step 180-1 has been completed, the depositing of the eighth step 160 can be repeated 165 (as represented by the return arrow), to provide additional deposition(s) to the article of the first step 101. Alternatively, the ninth step 180-1 can be replaced with another kind of post-deposition step, which modifies, treats, enhances, or finalizes the textural pattern deposited in the eighth step 160.

A tenth step 180-2 of the process 100 includes curing, on the article of the first step 101, the textural pattern deposited in the eighth step 160. While steps of the process 100 can be performed with various timings/orders, the present disclosure particularly contemplates embodiments wherein the curing of the tenth step 180-2 can begin before the pinning of the ninth step 180-1 has ended, such that portions of these steps can be performed at overlapping times. The curing of the tenth step 180-2 can be performed in any manner disclosed herein or known in the art. Optionally, the curing step 180-2 can be omitted for embodiments in which it is not necessary to cure the deposited textural pattern. Alternatively, the tenth step 180-2 can be combined with the ninth step 180-1, such that the pinning and the curing are performed as a single seamless step. Also, alternatively, the tenth step 180-2 can be replaced with another kind of post-pinning step, which modifies, treats, enhances, or finalizes the textural pattern pinned in the ninth step 180-1.

An eleventh step 139 of the process 100 includes unloading the article of the first step 101 from the machine of the fourth step 104. The unloading of the eleventh step 139 can be performed in any manner disclosed herein or known in the art. For example, the unloading can be performed by essentially reversing the loading of the fifth step 130, as described in connection with the embodiments of FIGS. 7A and 7B. Also, optionally, the eleventh step 139 can be omitted, and the article can be removed from the machine of the fourth step, without an unloading step or the article can continue on in the machine for downstream processing and/or packaging.

In various embodiments, the steps of the process 100, can be performed in the order shown in FIG. 1 (top to bottom), or in other orders, in sequential fashion or with one or more steps performed at overlapping times or with one or more steps performed in parallel, or with certain steps omitted (as described above), or with one or more additional steps, in any workable way, as will be understood by skilled in the art.

FIGS. 2A-2C illustrates an exemplary article of manufacture 210, with an exterior surface 213 having an overall shape that is cylindrical. FIG. 2A illustrates a bottom end view of the article 210; FIG. 2B illustrates a side view of the article 210; and FIG. 2C illustrates a cross-sectional view of the article 210, taken in the (longitudinally) middle of the article 210. The article 210 includes a longitudinal axis 215 disposed down the center of its overall shape, as well as a horizontal reference axis 216 and a vertical reference axis 217, which intersect each other at the longitudinal axis 215.

The article 210 includes a bottom 213 with a flat bottom end 211 formed by one end of the cylindrical shape and a top 218 with a flat top end 219 formed by the other end of the cylindrical shape. The article 210 has an overall length measured linearly, parallel with the longitudinal axis 215, between an outer extent of the top end 219 and an outer extent of the bottom end 211. The article 210 has an exterior surface 213, which includes the outside of the article, including the bottom end 211, the top end 219, and an exterior side surface 214 that is formed by the curved roll face of the cylindrical shape and that is offset from the longitudinal axis 215. The exterior side surface 214 also has an overall length measured linearly, parallel with the longitudinal axis 215, as a largest distance between an outer extent of the exterior side surface 214 at the top 218 and an outer extent of the exterior side surface 214 at the bottom 212. A portion of the exterior surface 213 on the bottom end 211 includes a mechanical feature 211-*mf*, which is a surface structure suitable for being detected by a sensor, in a registration step, such as the seventh step 150 of FIG. 1, and as described herein. The mechanical feature 211-*mf* is illustrated as an inclined, annular-sector-shaped indentation that is radially angled and disposed on the bottom end 211, however, in various embodiments, the mechanical feature 211-*mf* can take various forms. The article 210 also includes a body portion 210-*b* and a cap portion 210-*c*, wherein the cap portion 210-*c* can form a removable/replaceable cap, as known in the art.

As seen in the view of FIG. 2B, due to the cylindrical shape of the article 210, from the bottom end 211 to the top end 219, the exterior side surface 214 is offset from the longitudinal axis 215 by a constant distance, resulting in an overall surface profile that is substantially flat and horizontal. As seen in the view of FIG. 2C, the article 210 has an overall cross-sectional shape that is circular and thus, symmetrical about the longitudinal axis 215. The article 210 also has an overall cross-sectional dimension 225, measured linearly, perpendicular to the longitudinal axis 215, across its widest cross-width, which can be various sizes, such as, for example 1-5 centimeters, or any range of sizes, or any particular size formed by any integer from 1-5 centimeters.

In various embodiments, part, parts, or all of the article 210 can be varied by one or more of any alternate and/or additional sizes, shapes, proportions, geometries, and/or structural features, disclosed herein and/or known in the art, in any workable combination, to be an elongated, three-dimensional, discrete article of manufacture with a different overall shape. In particular, it is contemplated that such an article may be only partially cylindrical, having a cylindrical shape over one or more portions of its overall length and/or over one or more portions of its exterior side surface, with other portions having one or more different shapes. In further alternative embodiments, either or both ends of the article 210 can be configured with any convenient shape. In still further alternative embodiments, part, parts, or all of the overall cross-sectional shape of the article 210 can be a continuously rounded shape (e.g. oval, elliptical, etc.) or can be polygonal (triangular, squarish, pentagonal, hexagonal, etc.) with rounded corners or can be one or more other cross-sectional shapes that are symmetrical about a longitudinal axis of the article. In various embodiments, the article 210 can be a primary package for a disposable consumer product, such as a cosmetic product (e.g. mascara).

The article 210, and any of its alternate embodiments, can be suitable for decorating with an indicium and a textural pattern, according to embodiments of the present disclosure.

Figures 3A, 3B, 3C:
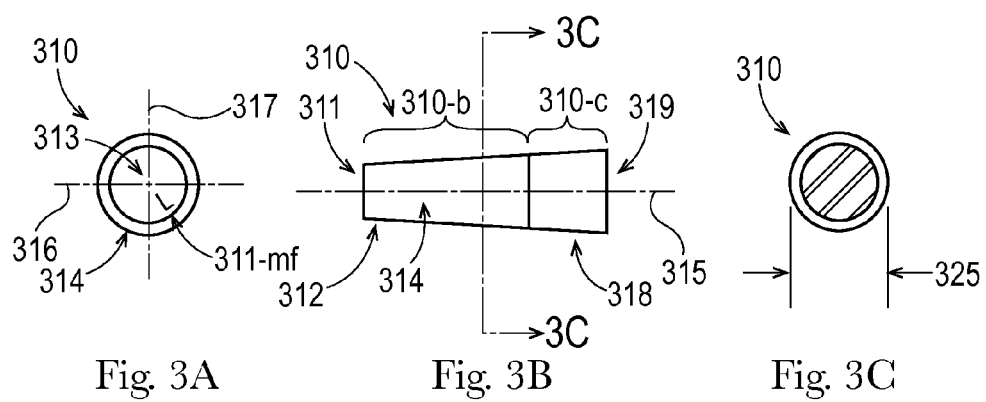
FIG. 3A illustrates a bottom end view of an exemplary article of manufacture, with an exterior surface having an overall shape that is frustoconical and is suitable for decorating with an indicium and a textural pattern, according to embodiments of the present disclosure.
FIG. 3B illustrates a side view of the article of FIG. 3A.
FIG. 3C illustrates a cross-sectional view of the article of FIG. 3B.

FIGS. 3A-3C illustrates an exemplary article of manufacture 310, with an exterior surface 313 having an overall shape that is frustoconical. FIG. 3A illustrates a bottom end view of the article 310; FIG. 3B illustrates a side view of the article 310; and FIG. 3C illustrates a cross-sectional view of the article 310, taken in the (longitudinally) middle of the article 310. The article 310 includes a longitudinal axis 315 disposed down the center of its overall shape, as well as a horizontal reference axis 316 and a vertical reference axis 317, which intersect each other at the longitudinal axis 315.

The article 310 includes a bottom 312 with a flat bottom end 311 formed by the smaller end of the frustoconical shape and a top 318 with a flat top end 319 formed by the larger end of the frustoconical shape. The article 310 has an overall length measured linearly, parallel with the longitudinal axis 315, between an outer extent of the top end 319 and an outer extent of the bottom end 311. The article 310 has an exterior surface 313, which includes the outside of the article, including the bottom end 311, the top end 319, and an exterior side surface 314 formed by the curved roll face of the frustoconical shape and offset from the longitudinal axis 315. The exterior side surface 314 also has an overall length measured linearly, parallel with the longitudinal axis 315, as a largest distance between an outer extent of the exterior side surface 314 at the top 318 and an outer extent of the exterior side surface 314 at the bottom 312. A portion of the exterior surface 313 on the bottom end 311 includes a mechanical feature 311-*mf*. The mechanical feature 311-*mf* is illustrated as an inclined, annular-sector-shaped indentation radially angled and disposed on the bottom end 311. The article 310 also includes a body portion 310-*b* and a cap portion 310-*c*, wherein the cap portion 310-*c* can form a removable/replaceable cap, as known in the art.

As seen in the view of FIG. 3B, due to the frustoconical shape of the article 310, from the bottom end 311 to the top end 319, the exterior side surface 314 is offset from the longitudinal axis 315 by an increasing distance, resulting in an overall surface profile that is substantially flat but inclined at an angle. As seen in the view of FIG. 3C, the article 310 has an overall cross-sectional shape that is circular and thus, symmetrical about the longitudinal axis 315. The article 310 also has an overall cross-sectional dimension 325, measured linearly, perpendicular to the longitudinal axis 315, across its widest cross-width, which can be various sizes, such as, for example 1-5 centimeters, or any range of sizes, or any particular size formed by any integer from 1-5 centimeters.

In various embodiments, part, parts, or all of the article 310 can be varied by one or more of any alternate and/or additional sizes, shapes, proportions, geometries, and/or structural features, disclosed herein and/or known in the art, in any workable combination, to be an elongated, three-dimensional, discrete article of manufacture with a different overall shape. In particular, it is contemplated that such an article may be only partially frustoconical, having a frustoconical shape over one or more portions of its overall length and/or over one or more portions of its exterior side surface, with other portions having one or more different shapes. In further alternative embodiments, either or both ends of the article 310 can be configured with any convenient shape. In still further alternative embodiments, part, parts, or all of the overall cross-sectional shape of the article 310 can be a continuously rounded shape (e.g. oval, elliptical, etc.) or can be polygonal (triangular, squarish, pentagonal, hexagonal, etc.) with rounded corners or can be one or more other cross-sectional shapes that are symmetrical about a longitudinal axis of the article. In various embodiments, the article 310 can be a primary package for a disposable consumer product, such as a cosmetic product (e.g. mascara).

The article 310, and any of its alternate embodiments, can be suitable for decorating with an indicium and a textural pattern, according to embodiments of the present disclosure.

Figures 4A, 4B, 4C:
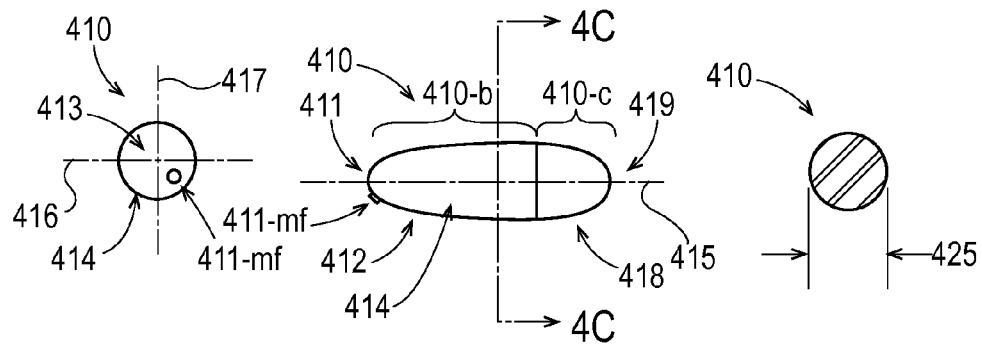
FIG. 4A illustrates a bottom end view of an exemplary article of manufacture, with an exterior surface having an overall shape that is cigar-shaped and is suitable for decorating with an indicium and a textural pattern, according to embodiments of the present disclosure.
FIG. 4B illustrates a side view of the article of FIG. 4A.
FIG. 4C illustrates a cross-sectional view of the article of FIG. 4B.

FIGS. 4A-4C illustrates an exemplary article of manufacture 410, with an exterior surface 413 having an overall shape that is cigar-shaped (i.e. continuously curved with a relatively thicker middle and rounded ends). FIG. 4A illustrates a bottom end view of the article 410; FIG. 4B illustrates a side view of the article 410; and FIG. 4C illustrates a cross-sectional view of the article 410, taken in the (longitudinally) middle of the article 410. The article 410 includes a longitudinal axis 415 disposed down the center of its overall shape, as well as a horizontal reference axis 416 and a vertical reference axis 417, which intersect each other at the longitudinal axis 415.

The article 410 includes a bottom 412 with a rounded bottom end 411 formed by one end of the cigar-shape and a top 418 with a rounded top end 419 formed by the other end of the cigar-shape. The article 410 has an overall length measured linearly, parallel with the longitudinal axis 415, between an outer extent of the top end 418 and an outer extent of the bottom end 411. The article 410 has an exterior surface 413, which includes the outside of the article, including the bottom end 411, the top end 419, and an exterior side surface 414 formed by the curved roll face of the cigar-shape and offset from the longitudinal axis 415. The exterior side surface 414 also has an overall length measured linearly, parallel with the longitudinal axis 415, as a largest distance between an outer extent of the exterior side surface 414 at the top 418 and an outer extent of the exterior side surface 414 at the bottom 412. A portion of the exterior surface 413 on the bottom end 411 includes a mechanical feature 411-*mf*. The mechanical feature 411-*mf* is illustrated as a round protrusion disposed on the bottom end 411. The article 410 also includes a body portion 410-*b* and a cap portion 410-*c*, wherein the cap portion 410-*c* can form a removable/replaceable cap, as known in the art.

As seen in the view of FIG. 4B, due to the cigar-shape of the article 410, from the bottom end 411 to the top end 419, the exterior side surface 414 is offset from the longitudinal axis 415 by a varying distance—increasing then decreasing—resulting in an overall surface profile that is curved but with portions that could be considered about flat. As seen in the view of FIG. 4C, the article 410 has an overall cross-sectional shape that is circular and thus, symmetrical about the longitudinal axis 415. The article 410 also has an overall cross-sectional dimension 425, measured linearly, perpendicular to the longitudinal axis 415, across its widest cross-width, which can be various sizes, such as, for example 1-5 centimeters, or any range of sizes, or any particular size formed by any integer from 1-5 centimeters.

In various embodiments, part, parts, or all of the article 410 can be varied by one or more of any alternate and/or additional sizes, shapes, proportions, geometries, and/or structural features, disclosed herein and/or known in the art, in any workable combination, to be an elongated, three-dimensional, discrete article of manufacture with a different overall shape. In particular, it is contemplated that such an article may be only partially cigar-shaped, having a cigar-shape over one or more portions of its overall length and/or over one or more portions of its exterior side surface, with other portions having one or more different shapes. In further alternative embodiments, either or both ends of the article 410 can be configured with any convenient shape. In still further alternative embodiments, part, parts, or all of the overall cross-sectional shape of the article 410 can be a continuously rounded shape (e.g. oval, elliptical, etc.) or can be polygonal (triangular, squarish, pentagonal, hexagonal, etc.) with rounded corners or can be one or more other cross-sectional shapes that are symmetrical about a longitudinal axis of the article. In various embodiments, the article 410 can be a primary package for a disposable consumer product, such as a cosmetic product (e.g. mascara).

The article 410, and any of its alternate embodiments, can be suitable for decorating with an indicium and a textural pattern, according to embodiments of the present disclosure.

FIGS. 5A-13C illustrate the use of machines disclosed herein to perform the processes disclosed herein on an exemplary article of manufacture, as disclosed herein. In particular, FIGS. 5A-13C illustrate the use of the machine 1204-*a* of FIG. 12A to perform the process 100 of FIG. 1 on the article 510 of FIG. 5, to decorate that article with a decorative indicium and the textural pattern 670 of FIG. 6B. However, the scope of the present disclosure is not limited to this particular combination of machine, process, and article. Any of the embodiments of machines described herein can be used to perform any of the embodiments of decorating processes described herein on any elongated, three-dimensional, discrete articles of manufacture described herein or known in the art, in any workable combination.

FIGS. 5A-5C illustrate the exemplary article of manufacture 510, having an indicium 502. FIG. 5A illustrates a top perspective view of the article 510; FIG. 5B illustrates a top view of the article 510; and FIG. 5C illustrates a bottom end view of the article 510. In FIGS. 5A-5C, the article 510 is the same as the article 210 of FIGS. 2A-2C, with like-numbered elements configured in the same way, except that the article 510 includes the indicium 502, as described below.

The indicium 502 is illustrated in FIGS. 5A-5C as a star. However, it is contemplated that the indicium 502 can be any kind of indicium described herein or known in the art. The indicium 502 is disposed on the exterior side surface 514 of the article, at a particular location 502-*pl* on the body-portion 510-*b* of the article 510. In FIGS. 5A-5C, the particular location 502-*pl* is illustrated with a circle (formed by a reference line) that circumscribes the star shape of the indicium 510. However, the particular location 510-*pl* is not limited to any particular size or shape, but is intended to represent the designated placement of the indicium 502 on the exterior side surface 514. The indicium 502 of FIGS. 5A-5C is a hot-stamped indicium, applied by a conventional hot-stamping decoration process, using a heated die to stamp a metal foil onto the exterior side surface 514 of the article 510, as will be understood by one skilled in the art. However, it is contemplated that the indicium 502 can be applied by any kind of (contact or non-contact) decoration process known in the art.

While the article 510 is described above as being based on the article 210, in alternative embodiments, the article 510 can be any elongated, three-dimensional, discrete article of manufacturing suitable for decorating with a textural pattern, as described in connection with the process 100 of FIG. 1. For example, the article 510 can be based on the article 210 of FIGS. 2A-2C, the article 310 of FIGS. 3A-3C, the article 410 of FIGS. 4A-4C, or any of their alternative embodiments.

FIG. 6A illustrates a plan view of an exterior side surface 614-1*f* of a cylindrical article of manufacture, as if the article has been laid out flat. In FIG. 6A, the exterior side surface 614-1*f* is the same as the exterior side surface 514 of the article 510 of FIGS. 5A-5C, except that the exterior side surface 614-1*f* is laid out flat in a rectangular shape, as described below. The exterior side surface 614-1*f* is suitable for decorating with a textural pattern.

The exterior side surface 614-1*f* includes a longitudinal centerline 615 that is parallel with a leading edge 622 and a trailing edge 623 and disposed in the center of an overall circumferential dimension 624, described below.

The exterior side surface 614-1*f* has locations and dimensions that correspond with locations and dimensions of the exterior side surface 514 of the article 510. The exterior side surface 614-1*f* includes a linear bottom edge 621 that corresponds with the outer extent of the exterior side surface 514 at the bottom 512 of the article 510. The exterior side surface 614-1*f* includes a linear top edge 628 that corresponds with the outer extent of the exterior side surface 514 at the top 518 of the article 510. The exterior side surface 614-1*f* includes an overall length 620 measured linearly as a largest distance between the bottom edge 621 and the top edge 628; the overall length 620 corresponds with the overall length of the exterior surface 514 of the article 510.

The exterior side surface 614-1f includes a linear leading edge 622 and a linear trailing edge 623, which are formed by an imaginary parting line on the article 510, parallel with the longitudinal axis 515 and intersecting with the vertical reference axis 517 on the exterior side surface 514 on the side opposite from the indicium 502; in this embodiment, the parting line is simply taken at a convenient location. However, in various embodiments, this parting line can be taken in any workable way, to lay an exterior side surface out flat. The leading edge 622 and the trailing edge 623 are designated as such, to identify their relative order, with respect to a direction of a linear movement 614-m for the exterior side surface 614-1f.

The exterior side surface 614-1f is configured to move with the linear movement 614-1f when the article of manufacture that includes the exterior side surface 614-1f is rotated. That is, when the article 510 is rotated clockwise around its longitudinal axis 515 (when viewed from its top end 519), the exterior side surface 514 experiences rotary movement, which, when the exterior side surface 614-1f is laid out flat, is illustrated as the corresponding linear movement 614-m. The linear movement 614-mf is perpendicular to the longitudinal centerline 615.

The exterior side surface 614-1f includes the overall circumferential dimension 624 measured linearly as a largest distance between the leading edge 622 and the trailing edge 623; the overall length 620 corresponds with the overall length of the exterior surface 514 of the article 510. The exterior side surface 614-1f also includes a meeting edge 626, where an edge of the body portion 510-b meets with an edge of the cap portion 510-c, on the article 510.

The exterior side surface 614-1f also includes an indicium 602, which is the same as the indicium 502 of FIGS. 5A-5C, but laid out flat. The indicium 602 is disposed on the exterior side surface 614-1f at a particular location 602-pl, which is the same as the particular location 502-pl of FIGS. 5A-5C, but its angular position on the curved exterior side surface 514 is translated to a corresponding rectilinear position on the laid flat exterior side surface 614-1f. Since, in FIGS. 5A-5C, the particular location 502-pl is disposed in the body portion 510-b, on an upward facing portion of the exterior side surface 514, and centered on the vertical reference axis 517, the particular location 602-pl is disposed below the meeting edge 626, on an upward facing portion of the exterior side surface 614-1f, and centered on the longitudinal centerline 615.

Figure 6B:
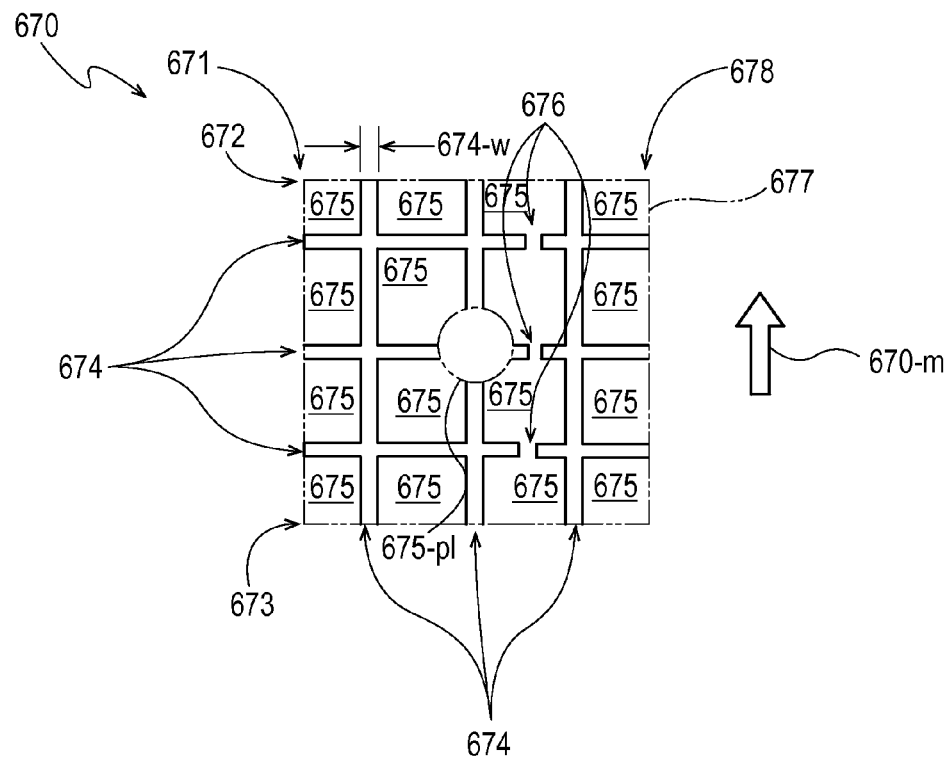
FIG. 6B illustrates a plan view of a textural pattern for decorating the exterior side surface article of the article of FIG. 5A, as if the textural pattern has been laid out flat.

The exterior side surface 614-1f is illustrated as laid flat in FIG. 6A to explain its relationship with the predetermined textural pattern of FIG. 6B. While the exterior side surface 614-1f is based on an exterior side surface of a cylindrical article of manufacture, the exterior side surfaces of other elongated, three-dimensional, discrete articles of manufacture described herein or known in the art, can also be laid out flat in a similar way, by transforming angular geometries to rectilinear geometries, as will be understood by one skilled in the art.

FIG. 6B illustrates a plan view of a predetermined textural pattern 670 of raised portions 674 and open areas 675, laid out flat, to be applied as decoration to the exterior side surface 614-1f of FIG. 6A. In a textural pattern, one or more raised portions are formed by one or more materials deposited on the exterior side surface of the article, while the open areas are formed by the portions of the exterior side surface, between and around the raised portion(s), without any deposited materials. In the textural pattern 670, the raised portions 674 are linear strips of a deposited material, each having a regular width 674-w, and arranged to form an orthogonal grid, with the open areas 675 having substantially rectangular shapes bounded by the raised portions 674 and bounded by an outer extent 677 of the textural pattern 670. However, in various embodiments, a textural pattern can be configured with any number of raised areas and any number of open areas, each having any size, shape, geometry, and/or pattern known in the art, in any workable combination.

The textural pattern 670 of FIG. 6B is configured and oriented with locations and dimensions that correspond with locations and dimensions of the exterior side surface 614-1f of FIG. 6A. The textural pattern 670 includes the rectangular outer extent 677 formed by a linear bottom edge 671, which connects with a linear trailing edge 673, which connects with a linear top edge 678, which connects with a linear leading edge 672, which connects back with the linear bottom edge 671. The bottom edge 671 of the textural pattern 670 corresponds with the bottom edge 621 of the exterior side surface 614-1f of FIG. 6A. The trailing edge 673 of the textural pattern 670 corresponds with the trailing edge 623 of the exterior side surface of FIG. 6A. The top edge 678 of the textural pattern 670 corresponds with the top edge 628 of the exterior side surface 614-1f of FIG. 6A. And, the leading edge 672 of the textural pattern 670 corresponds with the leading edge 622 of the exterior side surface 614-1f of FIG. 6A. However, in various embodiments, the locations of a leading edge and a trailing edge of a textural pattern may not correspond with a particular location on an exterior side surface, but may be chosen at any convenient location.

While the outer extent 677 of the textural pattern 670 is sized to fit substantially all of the available space on the exterior side surface 614-1f, in various embodiments, a textural pattern may be sized to use only some of the available space on an exterior side surface. For example, when only a portion of an exterior side surface is to be decorated, the outer extent 677 can be limited to that portion.

In addition to the open areas 675, the textural pattern 670 also includes other areas without deposited material, to accommodate various features on the exterior side surface 614-1f of FIG. 6A. Some of the strips of raised portions 674 are interrupted by a line of gaps 676 disposed at a fixed distance away from the top edge 678. The gaps 675 are intended to accommodate the meeting edge 626 of the exterior side surface 614-1f, so that the material that forms the textural pattern 670 is not deposited across the edge where the body portion of the article meets the cap portion of the article. Some of the raised portions 674 are also interrupted by a particular location 6'75-pl, illustrated with a circle (formed by a reference line). The particular location 6'75-pl is intended to accommodate the particular location 620-pl for the indicium 602 on the exterior side surface 614-1f, so that the material that forms the textural pattern 670 is not deposited over the top of the indicium on the exterior surface of the article. In various embodiments, one or more of the raised portion(s) of the textural pattern 670 may not extend all of the way to the outer extent 677 of the textural pattern, to allow one or more open areas to border part, parts, or all of the outer extent 677, such as the linear bottom edge 671, the linear trailing edge 673, the linear top edge 678, and/or the linear leading edge 672.

The textural pattern 670 is configured to be applied to the exterior side surface 614-1f of FIG. 6A when the article of manufacture that includes the exterior side surface 614-1f is rotated. That is, when the article is rotated and the exterior side surface 614-1f moves with corresponding linear movement 614-m, the textural pattern 670 is formed on the exterior side surface 614-1f by depositing the materials that form the raised areas 674, in one or more swaths disposed from the bottom edge 671 to the top edge 678, with the depositing beginning at the leading edge 672 and ending at the trailing edge 673, as illustrated by the direction of deposition 670-*m*.

In a textural pattern, all of the open areas, taken together, can account for varying percentages of the overall area of the textural pattern. For example, the open areas can account for 1-99% of the overall area of the textural pattern, or any integer value from 1-99%, or any range formed by any of the preceding values, in any combination.

Figure 7A:
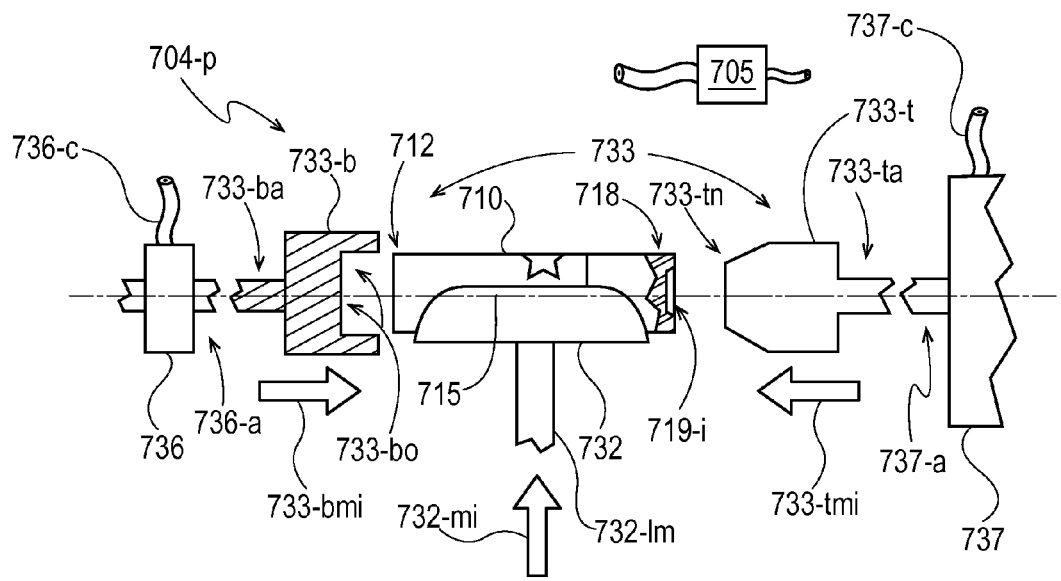
FIG. 7A illustrates a side view of part of a loading sub-assembly, at a first point in time, loading the article of FIG. 5A into an article holder, according to embodiments of the present disclosure.

FIG. 7A illustrates a side view of part of a loading sub-assembly 704-*p*, at a first point in time, loading an article 710 into an article holder 733, according to embodiments of the present disclosure. The article 710 is the same as the article 510 of FIG. 5A, with like-numbered elements configured in the same way, except that the article 710 includes a circular recessed area 719-*i* in its top end, as illustrated with the partially cut away top 718 of the article 710.

The loading sub-assembly 704-*p* includes an article carrier 732, a bottom portion 733-*b* of the article holder 733, an angular encoder 736, a top portion 733-*t* of the article holder 733, and a drive 737. The article carrier 732 includes an open carriage configured to hold the article 710 and to lift the article 710 up or down using lifting mechanism 732-1*m*. FIG. 7A illustrates the lifting mechanism 732-1*m* moving 732-*mi* the article 710 upward into a position where the article 710 can be captured and held by the article holder 733.

The bottom portion 733-*b* of the article holder 733 is configured to receive a bottom 712 of the article 710 into a bottom opening 733-*bo*, shown in the cut-away view of the bottom portion 733-*b*. The bottom portion 733-*b* includes a bottom axle 733-*ba*, which allows the article 710 to rotate while being held by the article holder 733. In FIG. 7A, the bottom portion 733-*b* is moving 733-*mi* inward to engage the bottom 712 of the article 710, to hold the article 710.

Though the bottom axle 733-*ba* is shown as broken (to indicate variable length and the possibility of intermediate components) the bottom axle 733-*ba* is axially connected to an encoder axle 736-*a* of the angular encoder 736. The angular encoder 736 includes a connection 736-*c* to enable the angular encoder 736 to communicate with a controller 705, which can receive a signal from the angular encoder 736 indicating an angular position of the article holder 733, which in turn indicates an angular position of the article 710 being held by the article holder 733. In various embodiments, an angular encoder can be configured to read an angular position of the article holder 733 or the article 710 without requiring an axial connection, as will be understood by one skilled in the art.

The top portion 733-*t* of the article holder 733 is configured with a nose end 733-*tn* to at least partially enter the circular recessed area 719-*i* in the top 718 of the article 710, as illustrated with the partially cut away top 718 of the article 710. The top portion 733-*t* includes a top axle 733-*ta*, which allows the article 710 to rotate while being held by the article holder 733. In FIG. 7A, the top portion 733-*t* is moving 733-*tmi* inward to engage the top 718 of the article 710, to hold the article 710.

Though the top axle 733-*ta* is shown as broken (to indicate variable length and the possibility of intermediate components) the top axle 733-*ta* is axially connected to a drive axle 737-*a* of the drive 737. The drive 737 includes a connection 737-*c* to enable the drive 737 to communicate with a controller 705, which can send a signal to the drive 737 with instructions for rotating the article holder 733, which in turn rotates the article 710 being held by the article holder 733. In various embodiments, a drive can be configured to rotate the article holder 733 or the article 710 without requiring an axial connection, as will be understood by one skilled in the art.

Figure 7B:
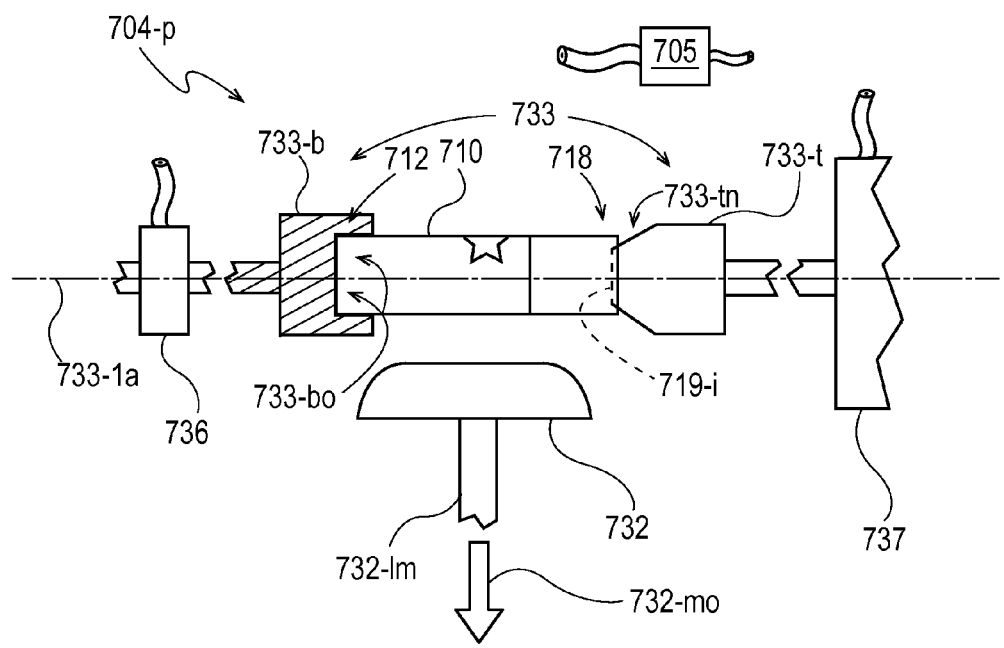
FIG. 7B illustrates a side view of the part of the loading sub-assembly of FIG. 7A, at a second point in time, having loaded the article of FIG. 5A into the article holder.

FIG. 7B illustrates a side view of the part of the loading sub-assembly 704-*p* of FIG. 7A, at a second point in time, having loaded the article 710 into the article holder 733. FIG. 7B illustrates the lifting mechanism 732-1*m* moving 732-*mo* downward away from the article 710 since the article 710 has been captured and held by the article holder 733. The bottom portion 733-*b* of the article holder 733 has received the bottom 712 of the article 710 into the bottom opening 733-*bo* and the nose end 733-*tn* of the top portion 733-*t* of the article holder 733 has at least partially entered the circular recessed area 719-*i* in the top 718 of the article 710, so the article holder 733 is holding the article 710, and the article holder 733 is configured to rotate with the article 710, while the article 710 is decorated using the processes and machines described herein.

Figure 8A:
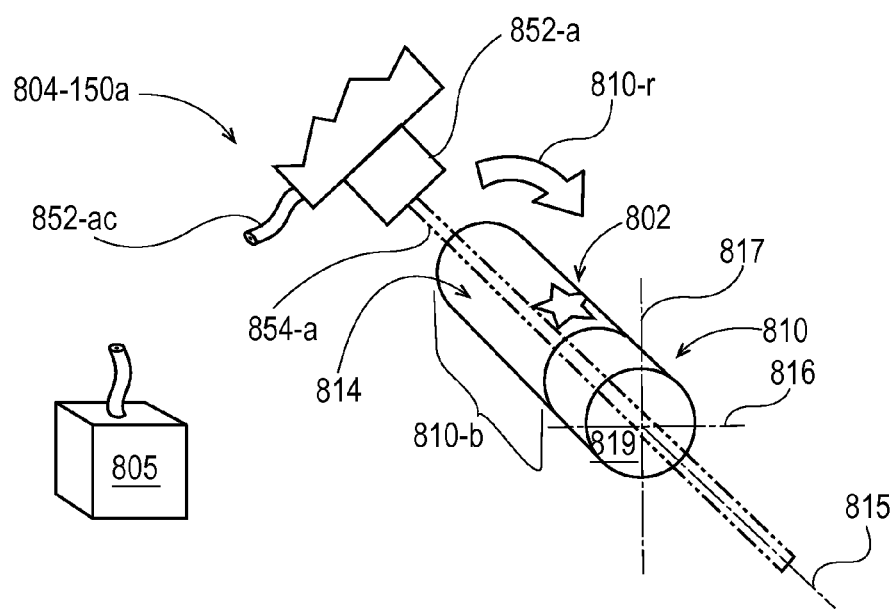
FIG. 8A illustrates a top perspective view of part of a registration sub-assembly for detecting a presence of the indicium on the exterior side surface of the article of manufacture of FIG. 5A, according to embodiments of the present disclosure.

FIG. 8A illustrates a top perspective view of part of a registration sub-assembly 804-150*a* for detecting a presence of an indicium 802 on an exterior side surface 814 of an article of manufacture 810, according to embodiments of the present disclosure. The article 810 is the same as the article 510 of FIGS. 5A-5C, with like-numbered elements configured in the same way. As the article 810 rotates 810-*r* around its longitudinal axis 815, a sensor 852-*a* sends a scanning emission 854-*a* onto at least a portion of the exterior side surface 814 to detect the presence of the indicium 802. The sensor 852 includes a connection 852-*ac* to enable the sensor 852-*a* to communicate with a controller 805, which can receive a signal from the sensor 852-*a* indicating that the presence of the indicium 802 is detected.

Figure 8B:
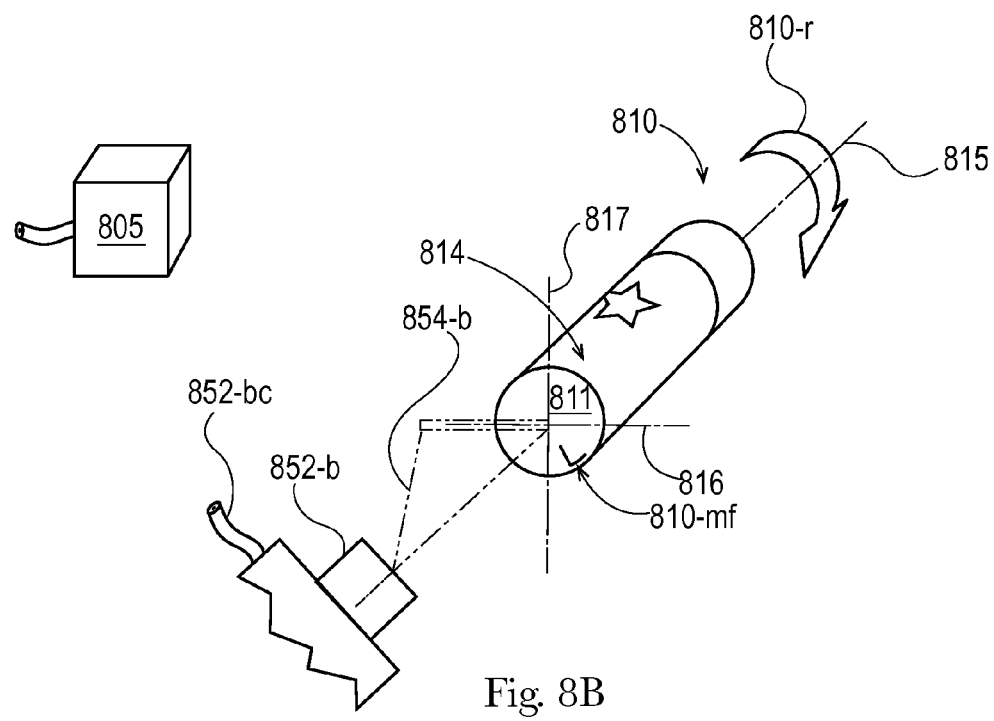
FIG. 8B illustrates a top perspective view of part of a registration sub-assembly for detecting a presence of a mechanical feature on the exterior end surface of the article of manufacture of FIG. 5A, according to embodiments of the present disclosure.

FIG. 8B illustrates a top perspective view of part of a registration sub-assembly 804-150*b* for detecting a presence of a mechanical feature 810-*mf* on the bottom end 811 of the article of manufacture 810, according to embodiments of the present disclosure. The article 810 is the same as the article 510 of FIGS. 5A-5C, with like-numbered elements configured in the same way. As the article 810 rotates 810-*r* around its longitudinal axis 815, a sensor 852-*b* sends a scanning emission 854-*b* onto at least a portion of the bottom end 811 to detect the presence of the mechanical feature 810-*mf*. The sensor 852-*b* includes a connection 852-*bc* to enable the sensor 852-*b* to communicate with a controller 805, which can receive a signal from the sensor 852-*b* indicating that the presence of the mechanical feature 810-*mf* is detected.

Figure 9:
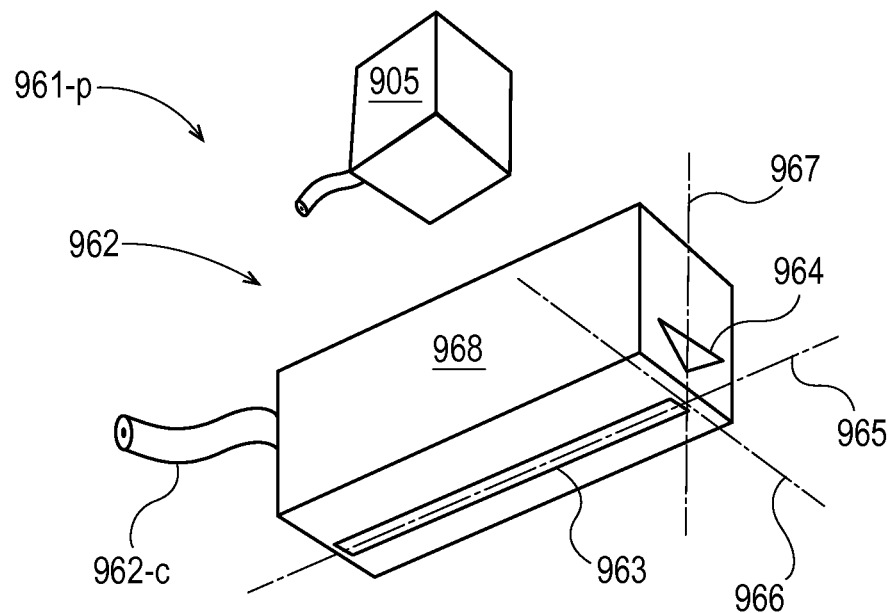
FIG. 9 illustrates a bottom perspective view of a non-contact, linearly arrayed, depositing-on-demand, pattern deposition device, according to embodiments of the present disclosure.

FIG. 9 illustrates a bottom perspective view of part of a deposition sub-assembly 961-*p* including a non-contact, linearly arrayed, depositing-on-demand, pattern deposition device 962, according to embodiments of the present disclosure. The pattern deposition device 962 includes a body 968 having an overall shape like a box. The bottom of the deposition device 962 includes a linear array 963 of emitters, from which the deposition device emits the material that is deposited onto a surface that is positioned underneath the array 963. The front end of the deposition device 962 includes an alignment indicia 964, which indicates the location of the array 963. The deposition device 962 includes a linear deposition axis 965 disposed on the outer face of the linear array 963, centered on its emitters, and parallel with its overall orientation. The deposition device 962 also includes a horizontal reference axis 966 and a vertical reference axis 967, which intersect each other at the linear deposition axis 963. The deposition device 962 includes a connection 962-c to enable the deposition device 962-c to communicate with a controller 905, which can send instructions to the deposition device 962-c, to deposit one or more layers of material in a predetermined textural pattern, onto a surface.

Figure 10A:
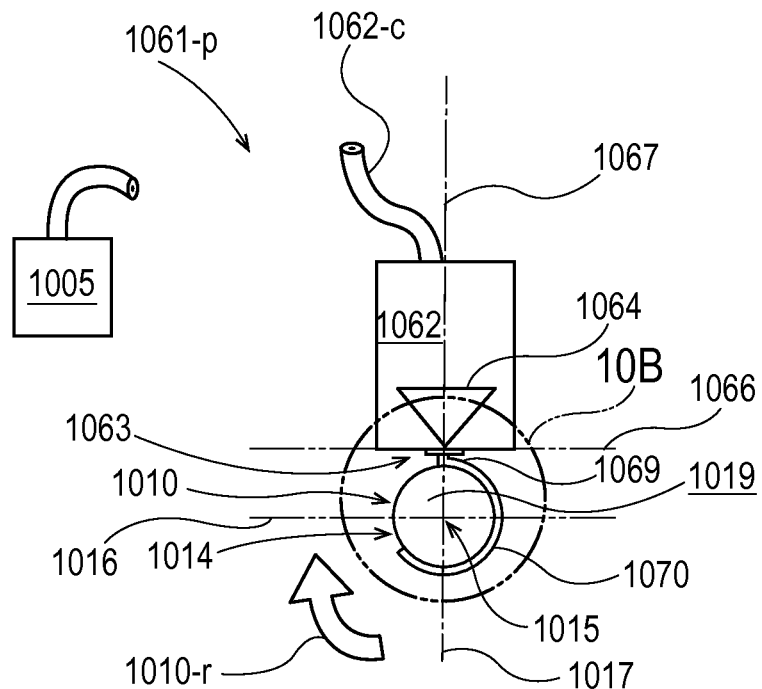
FIG. 10A illustrates a front end view of part of a deposition sub-assembly wherein the pattern deposition device of FIG. 9 is depositing a material to form the textural pattern of FIG. 6B onto an exterior side surface of the article of FIG. 5A while the article rotates around its longitudinal axis, according to embodiments of the present disclosure.

FIG. 10A illustrates a front end view of part of a deposition sub-assembly 1061-p wherein a pattern deposition device 1062 is depositing a material 1069 to form a textural pattern 1070 onto an exterior side surface 1014 of an article 1010 while the article rotates 1010-r around its longitudinal axis 1015, according to embodiments of the present disclosure. In FIG. 10A, the article 1010 is the same as the article 510 of FIGS. 5A-5C, the textural pattern 1070 is the same as the textural pattern 670 of FIG. 6B, the deposition device 1062 is the same as the deposition device 962 of FIG. 9, and the controller 1005 is the same as the controller 905 of FIG. 9, with like-numbered elements configured in the same way.

Figure 10B:
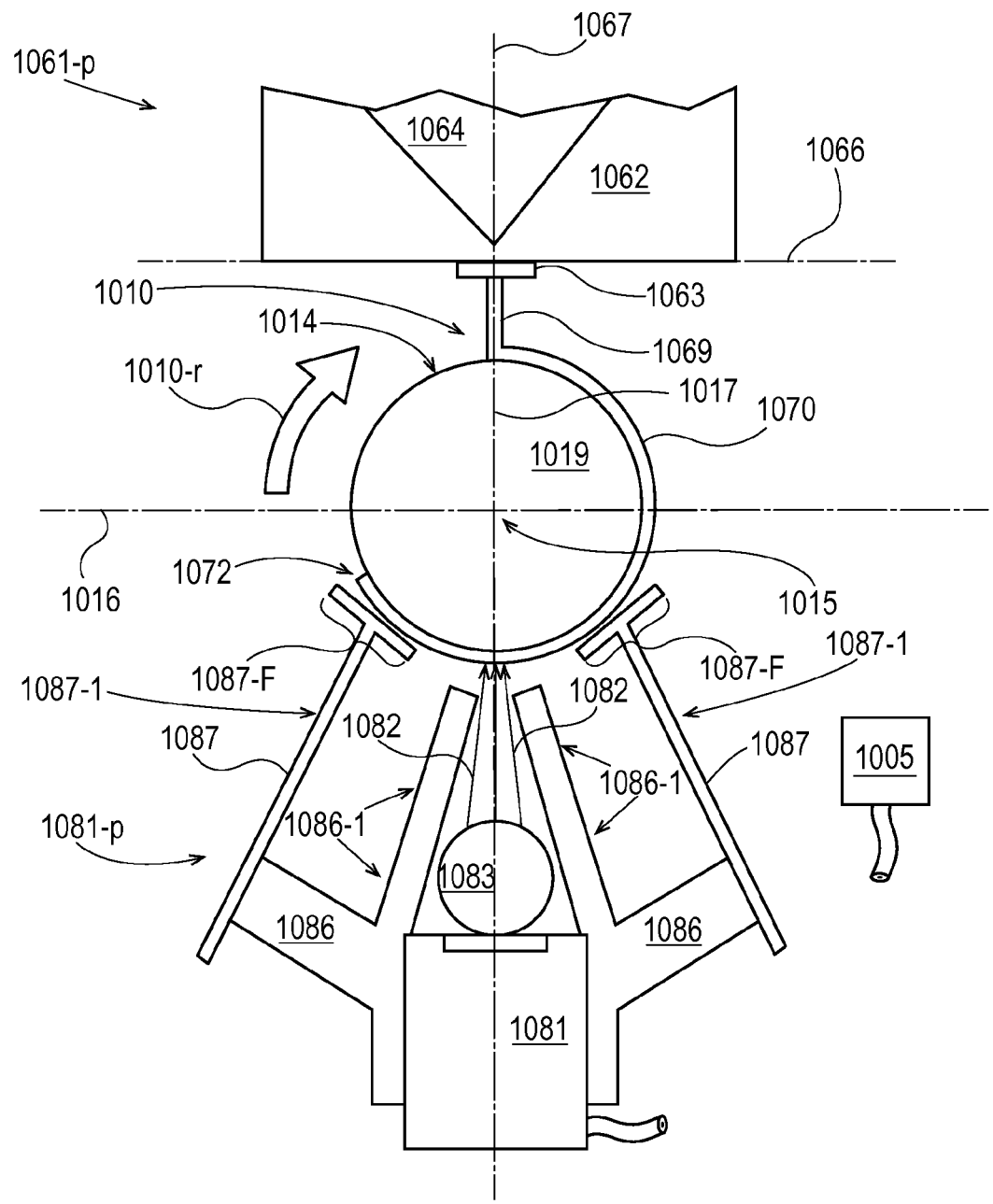
FIG. 10B illustrates an enlarged front end view of a portion of the deposition sub-assembly and article of FIG. 10A as well as part of a pinning sub-assembly wherein a pinning light source applies a pinning level of ultraviolet light onto the exterior side surface of the article, while the article rotates around its longitudinal axis, according to embodiments of the present disclosure.

FIG. 10B illustrates an enlarged front end view of a portion of the deposition sub-assembly 1061-p and the article 1010 of FIG. 10A as well as a part of a pinning sub-assembly 1081-p wherein a pinning light source 1081 applies a pinning level of ultraviolet light 1082 onto the exterior side surface 1014 of the article 1010, while the article rotates 1010-r around its longitudinal axis 1015, according to embodiments of the present disclosure. The pinning light source 1081 includes a focusing element 1083 for focusing the ultraviolet light 1082.

The pinning sub-assembly 1081-p also has light shields, which include inner light shields 1086 and outer light shields 1087 on each side of the pinning light source 1081. Each of the inner light shields 1086 has an extended leg 1086-1, which extends from the body of the pinning light source 1081 toward the article 1010 and terminates at a distal end that is disposed just offset from the exterior side surface 1014. Each of the outer light shields 1087 also has an extended leg 1087-1, which extends from the body of the pinning light source 1081 toward the article 1010 and terminates at its distal end with an optional foot 1087-f that is substantially perpendicular to the extended leg 1087-1 and disposed just offset from the exterior side surface 1014. The light shields 1086 and 1087 are configured to at least help prevent light from the pinning light source 1081 from reaching the linear array 1063 of the deposition device 1062, since such light exposure may damage the emitters in the linear array 1063.

Figure 11A:
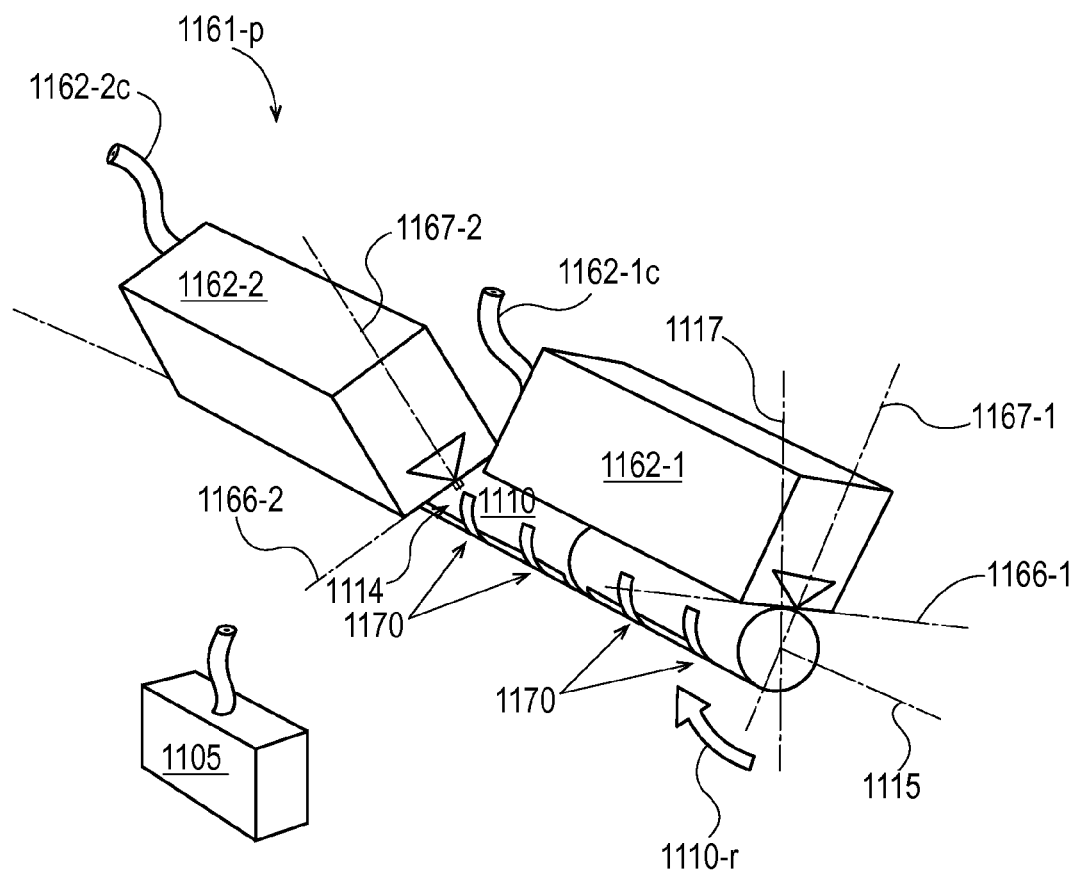
FIG. 11A illustrates a top perspective view of part of a deposition sub-assembly wherein two non-contact, linearly arrayed, depositing-on-demand, pattern deposition devices are depositing material to form a textural pattern onto an exterior side surface of an elongated, three-dimensional, discrete article of manufacture with an indicium, while the article rotates around its longitudinal axis, according to embodiments of the present disclosure.
Figure 11B:
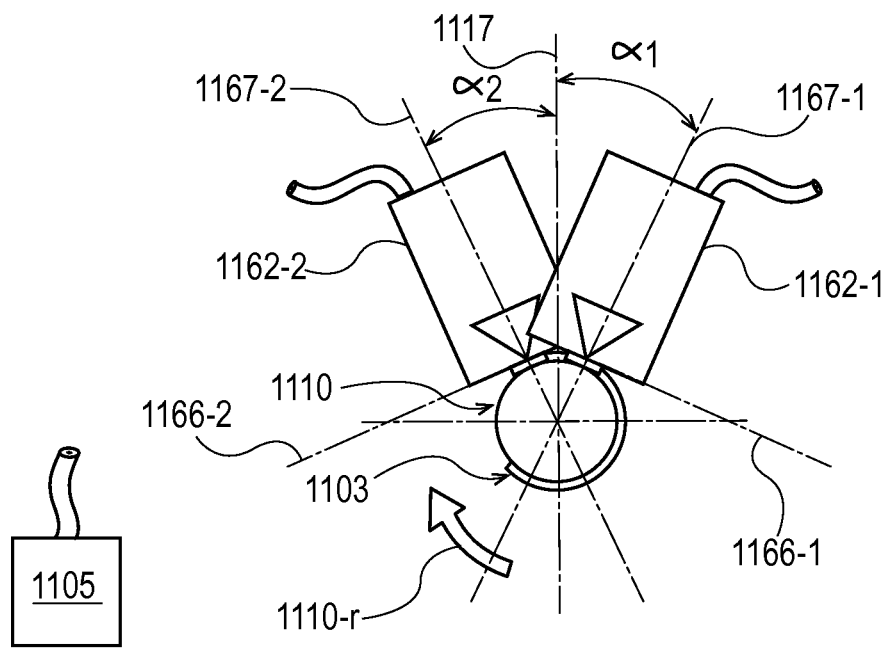
FIG. 11B illustrates a front end view of the part of the deposition sub-assembly and the article of manufacture of FIG. 11A.

FIGS. 11A-11B illustrate part of a deposition sub-assembly 1161-p wherein two non-contact, linearly arrayed, depositing-on-demand, pattern deposition devices 1162-1 and 1162-2 are depositing material to form a textural pattern 1170 onto an exterior side surface 1114 of an elongated, three-dimensional, discrete article 1110 of manufacture with an indicium, while the article 1110 rotates 1110-r around its longitudinal axis 1115, according to embodiments of the present disclosure. FIG. 11A illustrates a top perspective view; FIG. 11B illustrates a front end view. The elements of the embodiment of FIGS. 11A-11B are configured in the same way as the like-numbered elements in the embodiment of FIGS. 10A-10B, except that the article 1110 is longer than the article 1010 and there are two deposition devices 1062-1 and 1062-2, which are angled at angles α1 and α2 with respect to a vertical reference axis 1117 of the article 1110.

Figure 12A:
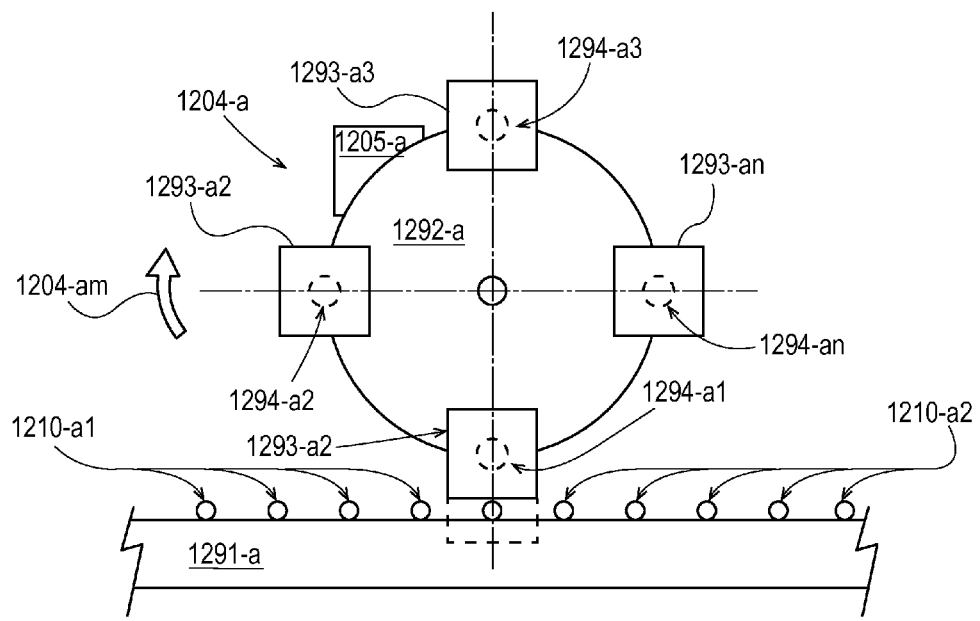
FIG. 12A illustrates a side view of a schematic of a machine for decorating elongated, three-dimensional, discrete articles of manufacture, the machine having an indexing sub-assembly configured for vertically oriented, non-reciprocating, rotary motion, and a plurality of sub-assemblies, according to embodiments of the present disclosure.

FIG. 12A illustrates a side view of a schematic of a machine 1204-a for decorating elongated, three-dimensional, discrete articles of manufacture 1210-a1, the machine 1204-a having an indexing sub-assembly 1292-a configured for vertically oriented, non-reciprocating, rotary motion 1204-am, and a plurality of sub-assemblies 1293-a1, 1293-a2, 1293-a3, and 1293-an, each configured according to the sub-assembly embodiments of the present disclosure, and each with a corresponding position 1294-a1, 1294-a2, 1294-a3, and 1294-an for an article as it is being processed in that sub-assembly, according to embodiments of the present disclosure. The machine 1204-a, which is controlled by a controller 1205-a that is configured according to the embodiments of controllers of the present disclosure, takes in undecorated or partially decorated articles 1210-a1 from a conveyor 1291-a and puts out fully decorated articles 1210-a2, decorated according to embodiments of the process 100 of FIG. 1, back on the conveyor 1291-a.

Figure 12B:
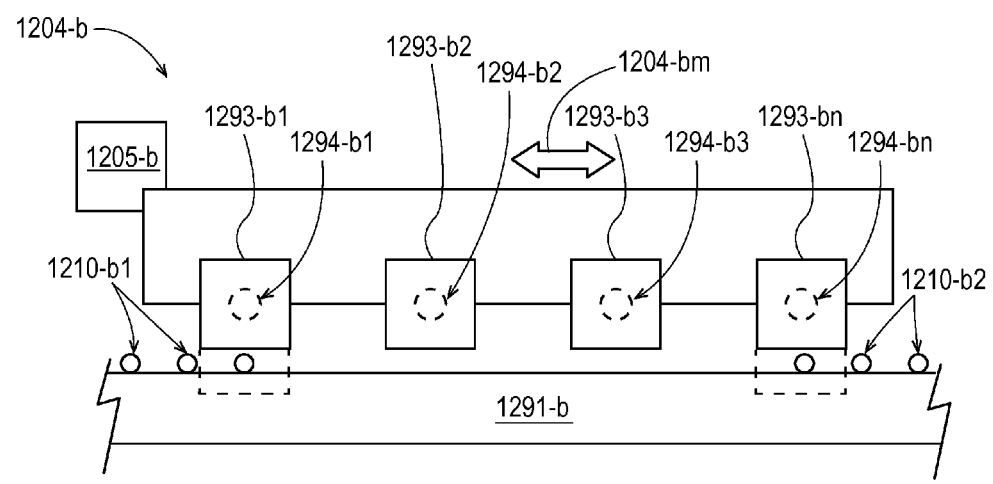
FIG. 12B illustrates a side view of a schematic of a machine for decorating elongated, three-dimensional, discrete articles of manufacture, the machine having an indexing sub-assembly configured for horizontally oriented, reciprocating, linear motion, and a plurality of sub-assemblies, according to embodiments of the present disclosure.

FIG. 12B illustrates a side view of a schematic of a machine 1204-b for decorating elongated, three-dimensional, discrete articles of manufacture 1210-b1, the machine 1204-b having an indexing sub-assembly 1292-b configured for horizontally oriented, reciprocating, linear motion 1204-bm, and a plurality of sub-assemblies 1293-b1, 1293-b2, 1293-b3, and 1293-bn, each configured according to the sub-assembly embodiments of the present disclosure, and each with a corresponding position 1294-b1, 1294-b2, 1294-b3, and 1294-bn for an article as it is being processed in that sub-assembly, according to embodiments of the present disclosure. The machine 1204-a, which is controlled by a controller 1205-b that is configured according to the embodiments of controllers of the present disclosure, takes in undecorated or partially decorated articles 1210-b1 from a conveyor 1291-b and puts out fully decorated articles 1210-b2, decorated according to embodiments of the process 100 of FIG. 1, back on the conveyor 1291-b.

Figure 13A:
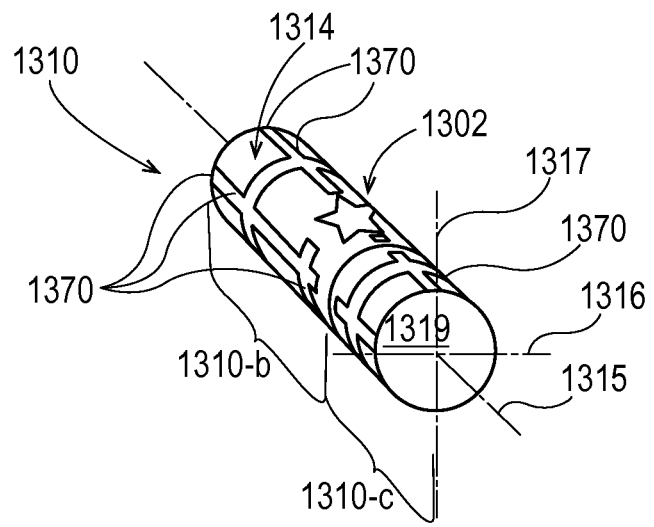
FIG. 13A illustrates a top perspective view of the article of manufacture of FIG. 5A with the indicium and having been decorated with the textural pattern of FIG. 6B, according to embodiments of the present disclosure.
Figures 13B, 13C:
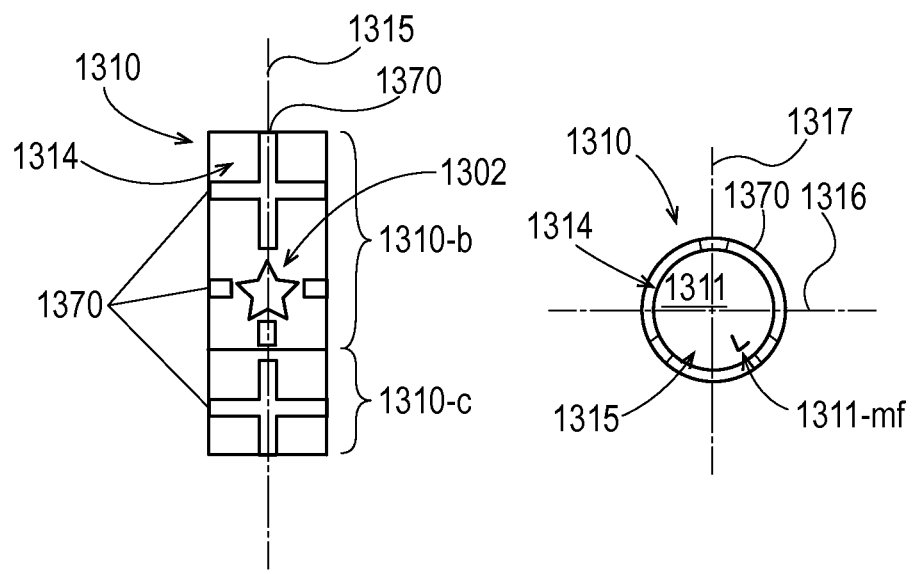
FIG. 13B illustrates a top view of the article of FIG. 13A.
FIG. 13C illustrates a bottom end view of the article of FIG. 13A.

FIGS. 13A-13C illustrate an exemplary article of manufacture 1310 with an indicium 1302 and having been decorated with a textural pattern 1370, according to embodiments of the present disclosure. FIG. 13A illustrates a top perspective view of the article 1310; FIG. 13B illustrates a top view of the article 1310; and FIG. 13C illustrates a bottom end view of the article 1310. In FIGS. 13A-13C, the article 1310 is the same as the article 510 of FIGS. 5A-5C, the indicium 1302 is the same as the indicium 502 of FIGS. 5A-5C, and the textural pattern 1370 is the same as the textural pattern 670 of FIG. 6B, with like-numbered elements configured in the same way. The article 1310 can be decorated using various embodiments of processes and machines described herein, including embodiments of the process 100 of FIG. 1 and embodiments of the machine 1204-a of FIG. 12A.

However, the scope of the present disclosure is not limited to this particular combination of machine, process, and article. Any of the embodiments of machines described herein can be used to perform any of the embodiments of decorating processes described herein on any elongated, three-dimensional, discrete articles of manufacture described herein or known in the art, in any workable combination. As a result, embodiments of the present disclosure can be used in efficiently and effectively decorating elongated, three-dimensional, discrete articles of manufacture to have combinations of decorative indicia and textural patterns, as described herein.

As used herein, the term "nearly" modifies a particular value, by referring to a range equal to the particular value, plus or minus five percent (+/−5%). For any of the embodiments disclosed herein, any disclosure of a particular value (or any quantitative or qualitative description, which can be modified by a term of approximation), can, in various alternate embodiments, also be understood as a disclosure of a range equal to approximately that particular value (i.e. +/−5%).

As used herein, the term "substantially" modifies a particular value, by referring to a range equal to the particular value, plus or minus ten percent (+/−10%). For any of the embodiments disclosed herein, any disclosure of a particular value (or any quantitative or qualitative description, which can be modified by a term of approximation), can, in various alternate embodiments, also be understood as a disclosure of a range equal to approximately that particular value (i.e. +/−10%).

As used herein, the term "approximately" modifies a particular value, by referring to a range equal to the particular value, plus or minus fifteen percent (+/−15%). For any of the embodiments disclosed herein, any disclosure of a particular value (or any quantitative or qualitative description, which can be modified by a term of approximation), can, in various alternate embodiments, also be understood as a disclosure of a range equal to approximately that particular value (i.e. +/−15%).

As used herein, the term "about" modifies a particular value, by referring to a range equal to the particular value, plus or minus twenty percent (+/−20%). For any of the embodiments disclosed herein, any disclosure of a particular value (or any quantitative or qualitative description, which can be modified by a term of approximation), can, in various alternate embodiments, also be understood as a disclosure of a range equal to about that particular value (i.e. +/−20%).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for decorating an article of manufacture, the process comprising:
    providing an elongated, three-dimensional, discrete article of manufacture with a longitudinal axis and an exterior surface, which includes an exterior side surface, at least part of which is offset from the longitudinal axis, wherein said exterior side surface comprises a textural pattern-receiving portion of said exterior side surface, and said pattern-receiving portion has a curvature when viewed perpendicular to said longitudinal axis, said article of manufacture further comprising an indicium disposed on the exterior side surface at a particular location;
    providing a predetermined textural pattern of raised portions and open areas, to be applied to the exterior side surface;
    providing one or more non-contact, linearly arrayed, depositing-on-demand, pattern deposition devices, each of which includes a linear deposition axis, wherein points along the pattern-receiving portion of the exterior side surface of said article of manufacture are in alignment with said linear deposition axis, and said points on said article of manufacture are spaced different distances away from the linear deposition axis when measured perpendicular to said linear deposition axis at different locations along the longitudinal axis of the article of manufacture; and
    depositing one or more layers of a material to form the predetermined textural pattern of raised portions on at least a portion of the exterior side surface, by using the one or more pattern deposition devices, while the article rotates around the longitudinal axis and while the one or more pattern deposition devices are stationary with respect to the longitudinal axis, wherein each of the layers is deposited according to a common registration, which is based on the particular location, wherein the raised portions have an overall height of 10-500 microns and are separated by open areas.

2. The process of claim 1, wherein the providing of the article includes providing the article, which includes the exterior side surface, wherein about all of the portion of the exterior side surface has an overall cross-sectional shape that is selected from the group including: continuously rounded and polygonal with rounded corners.

3. The process of claim 2, wherein about all of the portion of the exterior side surface of the article of manufacture has an overall cross-sectional shape that is polygonal with rounded corners.

4. The process of claim 1, wherein the providing of the article includes providing the article, which includes the exterior side surface, wherein the indicium is a contact-type indicium.

5. The process of claim 1, wherein the providing of the article includes providing the article, which includes the exterior side surface, wherein the indicium is a hot stamped indicium.

6. The process of claim 1, wherein the providing of the article includes providing the article, which is a primary package for a disposable consumer product.

7. The process of claim 1, wherein the providing of the article includes providing the article, which is a primary package for a cosmetic product.

8. The process of claim 1, including aligning the article, with respect to at least one of the pattern deposition devices, such that a surface profile of the portion of the exterior side surface is substantially parallel with the linear deposition axis of that pattern deposition device.

9. The process of claim 1, wherein:
    the providing of the deposition devices includes providing two non-contact, linearly arrayed, depositing-on-demand, pattern deposition devices; and
    the depositing includes depositing the one or more layers by using each of the pattern deposition devices, while each of the pattern deposition devices is stationary with respect to the longitudinal axis.

10. The process of claim 1, wherein the depositing includes depositing 2-20 layers of the material.

11. The process of claim 1, wherein the depositing includes depositing one or more layers of the material, which is a material that is curable with ultra-violet light.

12. The process of claim 1, wherein the depositing includes depositing one or more layers of the material, which is an acrylate based ink.

13. The process of claim 1, wherein the depositing includes rotating the article through at least one complete revolution.

14. The process of claim 1, wherein the depositing includes depositing while the article rotates around the longitudinal axis, through at least one complete revolution.

15. The process of claim 1, wherein:
the depositing includes depositing the one or more layers of the material, such that the one or more layers of material do not overlap the indicium;
the providing of the article including providing the article, which includes the indicium, which is disposed within a first part of a particular longitudinal portion of the exterior side surface; and
the depositing includes depositing the one or more layers of the material, within a second part of the particular longitudinal portion of the exterior side surface, which is non-overlapping with the first part.

16. The process of claim 1, including determining the particular location by using a non-contact sensor configured to detect a presence of at least a portion of the indicium.

17. The process of claim 1, including determining the particular location, based on a location of a mechanical feature of the article.

18. The process of claim 1:
including, providing an article holder, configured to hold the article in alignment, with respect to at least one of the pattern deposition devices, and configured to rotate the article around the longitudinal axis;
wherein, the providing of the article includes providing the article, while the article is being held by the article holder; and
including, determining the particular location, based on an angular position of the article holder.

19. The process of claim 18, including:
applying the indicium on the exterior side surface at the particular location; and
continuously holding the article in a fixed relationship with respect to the article holder, from the applying of the indicium through the depositing of the one or more layers.

20. The process of claim 1, including pinning at least a portion of each of the layers of the material, after the layer is at least partially deposited, but before depositing any subsequent layer of the material.

21. The process of claim 1, wherein the exterior side surface of the article of manufacture defines a curved, roll face.

22. A process for decorating an article of manufacture, the process comprising:
providing an elongated, three-dimensional, discrete article of manufacture with a longitudinal axis and an exterior surface, which includes an exterior side surface, at least part of which is offset from the longitudinal axis, wherein said exterior side surface comprises a textural pattern-receiving portion of said exterior side surface, and said pattern-receiving portion has a curvature when viewed perpendicular to said longitudinal axis, said article of manufacture further comprising an indicium disposed on the exterior side surface at a particular location;
providing a predetermined textural pattern of raised portions and open areas, to be applied to the exterior side surface;
providing one or more non-contact, linearly arrayed, depositing-on-demand, pattern deposition devices, each of which includes a linear deposition axis, wherein points along the pattern-receiving portion of the exterior side surface of said article of manufacture are in alignment with said linear deposition axis, and said points on said article of manufacture are spaced different distances away from the linear deposition axis when measured perpendicular to said linear deposition axis at different locations along the longitudinal axis of the article of manufacture;
depositing one or more layers of a material that is curable with ultra-violet light to form the predetermined textural pattern of raised portions on at least a portion of the exterior side surface, by using the one or more non-contact pattern deposition devices, while the article rotates around the longitudinal axis and while the one or more pattern deposition devices are stationary with respect to the longitudinal axis, wherein each of the layers is deposited according to a common registration, which is based on the particular location, such that the one or more layers of material do not overlap the indicium, wherein the raised portions have an overall height of 10-500 microns and are separated by open areas; and
pinning at least a portion of each of the layers of the material, after the layer is at least partially deposited, but before depositing any subsequent layer of the material.

23. A process for decorating an article of manufacture, the process comprising:
providing an elongated, three-dimensional, discrete article of manufacture with a longitudinal axis and an exterior surface, which includes an exterior side surface, at least part of which is offset from the longitudinal axis, wherein said exterior side surface comprises a textural pattern-receiving portion of said exterior side surface, and said pattern-receiving portion has a curvature when viewed perpendicular to said longitudinal axis, said article of manufacture further comprising an indicium disposed on the exterior side surface at a particular location;
providing a predetermined textural pattern of raised portions and open areas, to be applied to the exterior side surface in registration with said indicium, wherein said indicium and said predetermined textural pattern are different in type and/or in the processes used to create the indicium and the predetermined textural pattern;
providing a machine for decorating the article of manufacture, said machine comprising:
an indexing sub-assembly, comprising:
at least one article holder, configured to: hold in a fixed relationship, an elongated, three-dimensional, discrete article of manufacture; and rotate an article that is being held; and
at least one angular encoder, configured to detect an angular position of an article that is being held and rotated by the article holder, wherein the indexing sub-assembly is configured to move with an indexing movement within the machine to move the at least one article holder through each of a plurality of indexed positions, including: a registration indexed position with respect to a registration sub-assembly; and a deposition indexed position with respect to a deposition sub-assembly; and a registration sub-assembly comprising a sensor configured to detect a presence of a feature on an article that is being held by the article holder in the registration indexed position, wherein the registration sub-assembly is mounted to the machine separate from the indexing sub-assembly;

a deposition sub-assembly comprising one or more non-contact, linearly arrayed, depositing-on-demand, pattern deposition devices, each of which is configured to deposit one or more layers of a material onto an exterior side surface of an article that is being held by the article holder in the deposition indexed position and that is being rotated by the article holder, wherein the deposition sub-assembly is mounted to the machine separate from the indexing sub-assembly; and a controller in communication with the sensor, the angular encoder, and the one or more pattern deposition devices; and the controller is configured to: receive a detection signal from the sensor; receive an angular position from the angular encoder; and to send instructions to the one or more pattern deposition devices, to deposit one or more layers of material in a predetermined textural pattern, onto an exterior side surface of an article that is being held in the deposition position and rotated by the article holder;

providing one or more non-contact, linearly arrayed, depositing-on-demand, pattern deposition devices, each of which includes a linear deposition axis, wherein points along the pattern-receivirg portion of the exterior side surface of said article of manufacture are in alignment with said linear deposition axis, and said points on said article of manufacture are spaced different distances away from the linear deposition axis when measure perpendicular to said linear deposition axis at different locations along the longitudinal axis of the article of manufacture; and depositing one or more layers of a material to form the predetermined textural pattern of raised portions on at least a portion of the exterior side surface, by using the one or more pattern deposition devices, while the article rotates around the longitudinal axis and while the one or more pattern deposition devices are stationary with respect to the longitudinal axis, wherein each of the layers is deposited according to a common registration, which is based on the particular location, wherein the raised portions have an overall height of 10-500 microns and are separated by open areas.

* * * * *